United States Patent [19]

Suzuki et al.

[11] 4,179,743

[45] Dec. 18, 1979

[54] AUTOMATIC MICROFILM RETRIEVAL SYSTEM

[75] Inventors: Takeomi Suzuki, Tokyo; Asao Hayashi, Hachioji, both of Japan

[73] Assignee: Olympus Optical Company, Ltd., Tokyo, Japan

[21] Appl. No.: 927,164

[22] Filed: Jul. 24, 1978

[30] Foreign Application Priority Data

| Jul. 25, 1977 | [JP] | Japan | 52-88270 |
| Jul. 26, 1977 | [JP] | Japan | 52-89421 |
| Aug. 23, 1977 | [JP] | Japan | 52-100121 |

[51] Int. Cl.$^2$ .................... G06F 15/02; G03B 23/08
[52] U.S. Cl. .................... 364/518; 364/900; 353/27 A
[58] Field of Search .............. 353/25, 26 R, 26 A, 353/27 R, 27 A; 364/518, 525, 900

[56] References Cited

U.S. PATENT DOCUMENTS

| 3,564,209 | 2/1971 | Loughnane | 353/26 A X |
| 3,564,508 | 2/1971 | Loewenthal et al. | 364/900 |
| 3,612,676 | 10/1971 | Ooba et al. | 353/27 A |
| 3,781,809 | 12/1973 | Murakoshi et al. | 353/27 A X |
| 3,949,375 | 4/1976 | Ciarlo | 353/26 A X |
| 4,016,406 | 4/1977 | Abe et al. | 353/26 A X |
| 4,066,872 | 1/1978 | Karp et al. | 353/26 A |
| 4,068,934 | 1/1978 | Tanaka et al. | 353/26 A |
| 4,074,853 | 2/1978 | Flint | 353/26 A X |

*Primary Examiner*—Edward J. Wise
*Attorney, Agent, or Firm*—Haseltine, Lake & Waters

[57] ABSTRACT

An automatic microfilm retrieval system for retrieving contents of a dictionary or the like recorded on a microfilm and displaying them on a screen is disclosed. Said microfilm includes a retrieval cord and divided into a plurality of unit regions to be displayed on said screen at the same time and further includes a cord added to each of said unit regions and representing an index word whose contents are included in each of said unit regions. A plurality of said unit regions are assembled into a plurality of groups. To each of said groups are added cords representing first and last index words included in each of said groups. Provision is made of a subtracter which functions to compare said cords read out by a reading head with key inputs obtained by depressing keys provided on a key board and control movements of a movable stage holding said microfilm thereon, thereby retrieving said microfilm.

7 Claims, 30 Drawing Figures

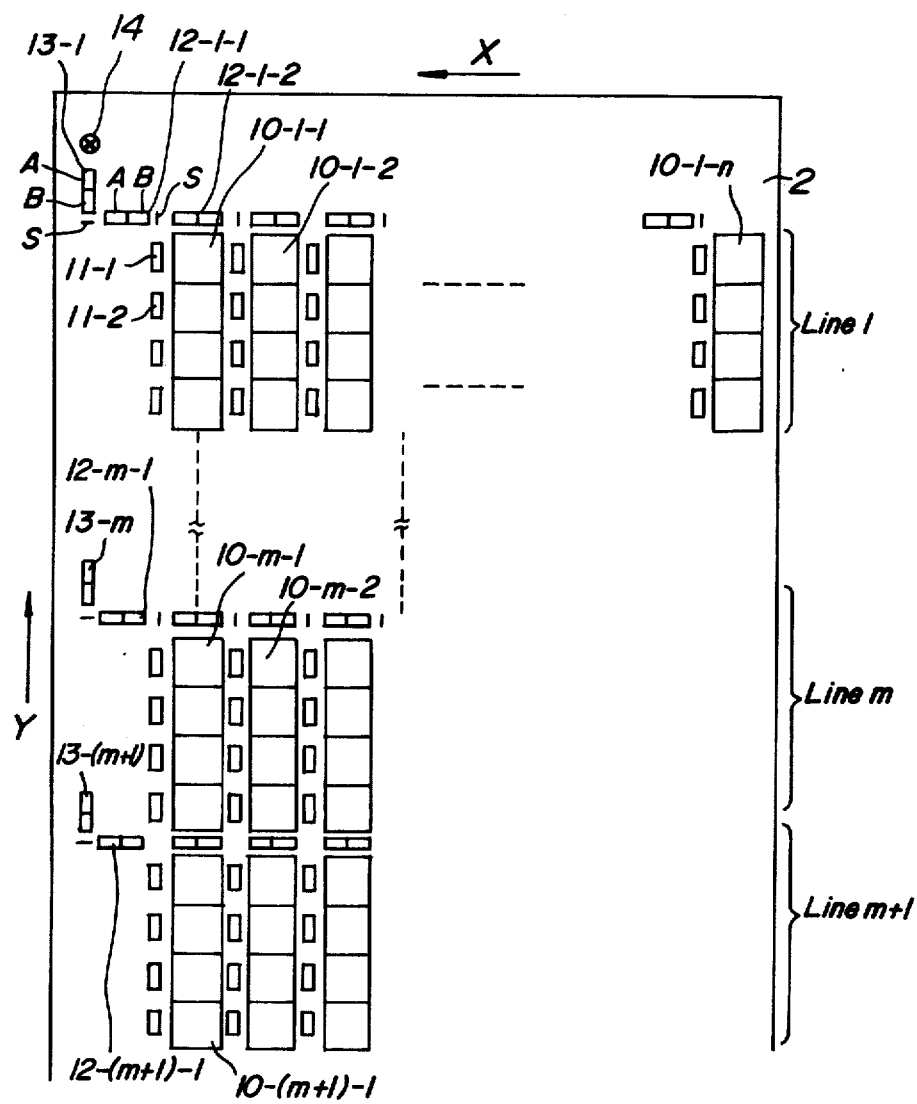

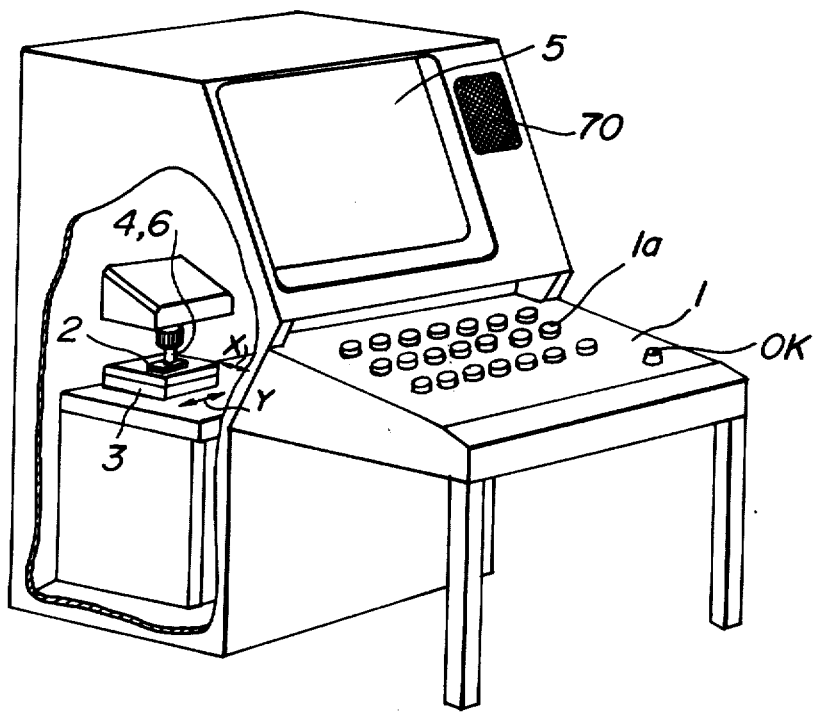
FIG_11
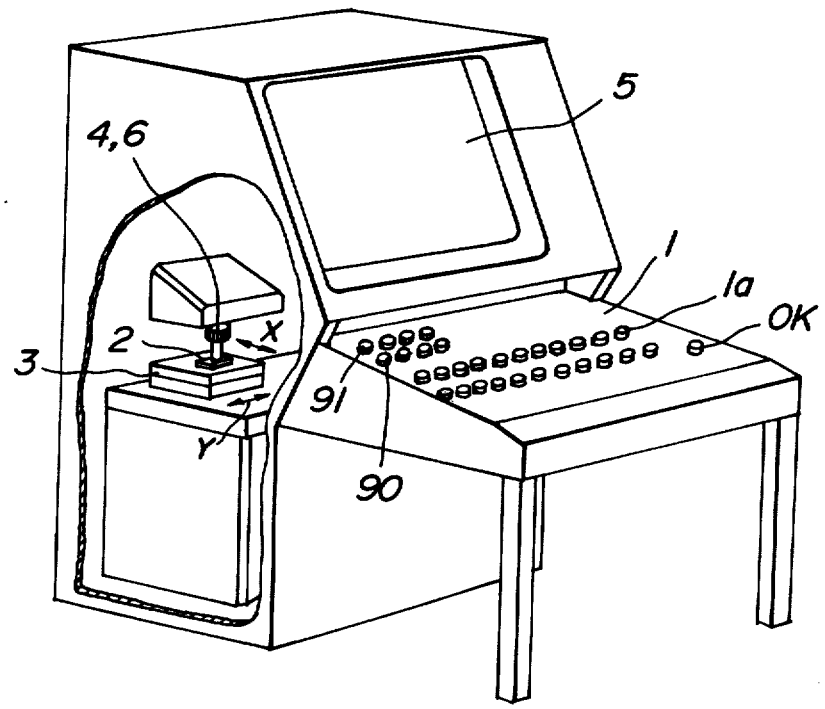
FIG_13

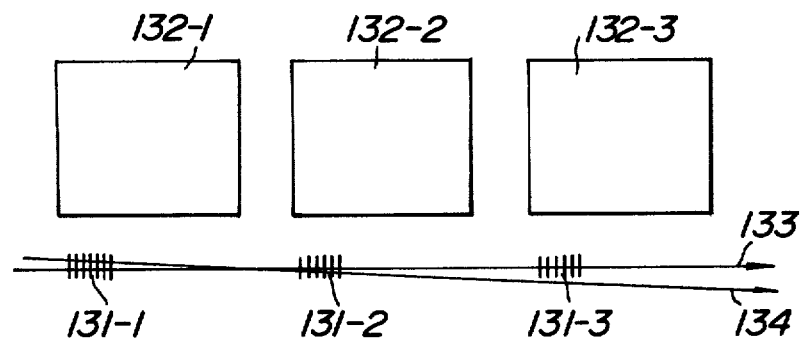
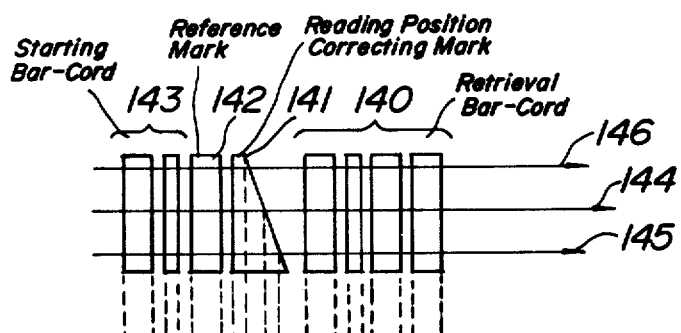

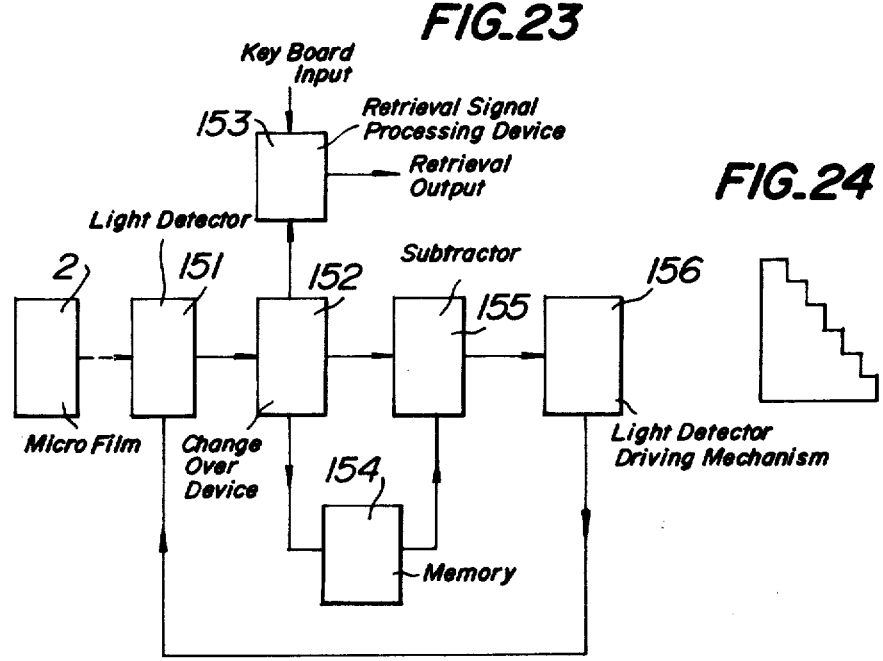
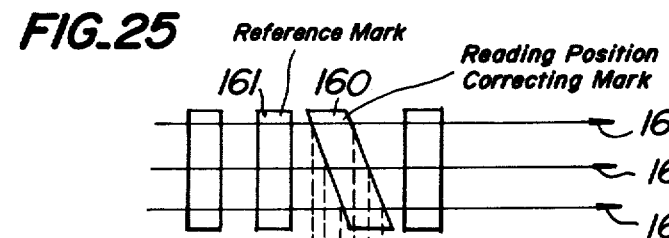
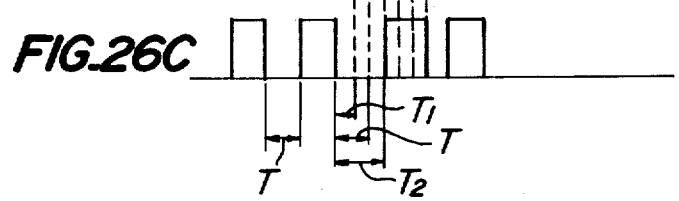

AUTOMATIC MICROFILM RETRIEVAL SYSTEM

BACKGROUND OF THE INVENTION

1. Field of the Invention

This invention relates to an automatic microfilm retrieval system which makes use of a microfilm bearing contents of a dictionary or the like recorded thereon and which can automatically retrieve a film portion bearing an index word in response to an input signal obtained by depressing keys.

2. Description of the Prior Art

Heretofore it has been the common practice to record an English-Japanese dictionary, for example, on a microfilm in a reduced scale, automatically retrieve a microfilm portion bearing a desired index word by depressing keys corresponding to such index word and project the retrieved microfilm portion on a screen in an enlarged scale. In this case, it is important to carry out successive steps of depressing the keys corresponding to the desired index word and retrieving the film portion bearing the index word in a rapid and reliable manner with the aid of a device which is simple in construction.

In the conventional microfilm retrieval system, in order to obtain a signal for retrieving a film portion, a signal representing the relation between an index word and a microfilm portion bearing the index word recorded thereon must be stored beforehand in a memory. This signal thus stored in the memory causes the index word corresponding to the depressed keys to convert into a signal corresponding to the microfilm portion bearing the index word and this signal is used for retrieving the microfilm.

In such conventional system, it is indispensable to use the memory, so that the system becomes complex in construction and very troublesome in operation of storing beforehand the above mentioned signal in the memory, that the system is constructed such that at first the input signal produced by depressing the keys is converted into a position representing signal and then the signal thus converted is used to retrieve the information on the microfilm, thereby limiting the retrieving speed, and that, in the case of replacing the existing microfilm by another kind of microfilm, provision must be made of a memory corresponding to such microfilm.

SUMMARY OF THE INVENTION

An object of the invention, therefore, is to provide an automatic microfilm retrieval system which can retrieve informations recorded on a microfilm in a rapid and reliable manner without requiring any memory and hence is simple in construction.

A feature of the invention is the provision in an automatic microfilm retrieval system comprising a stage movable in X and Y directions, a microfilm disposed on said stage and bearing contents of a dictionary or the like recorded thereon, an optical system and reading head arranged above and opposed to said microfilm, a screen and a key board provided thereon with a number of keys corresponding to index words to be retrieved, a microfilm portion corresponding to index words selected by depressing said keys being projected on said screen, the improvement comprising a retrieval cord recorded on said microfilm, the surface of said microfilm being divided into a plurality of unit regions to be displayed on said screen at the same time, a cord added to each of said unit regions and representing an index word whose contents are included in each of said unit regions, a plurality of said unit regions being assembled into a plurality of groups, cords added to each of said groups and representing first and last index words included in each of said groups, and a subtracter comparing said cords read out by said reading head with key inputs obtained by depressing said keys and controlling movements of said stage and retrieving said microfilm disposed thereon.

BRIEF DESCRIPTION OF THE DRAWINGS

FIG. 2 is an enlarged plan view of a microfilm for use in the system shown in FIG. 1;

FIG. 11 is a perspective view of another embodiment of an automatic microfilm retrieval system according to the invention;

FIG. 13 is a perspective view of a further embodiment of an automatic microfilm retrieval system according to the invention;

FIG. 20 is a diagram of contents of a dictionary and bar-cords recorded on a microfilm;

FIG. 21 is a diagram showing construction of the bar-cord shown in FIG. 20;

FIGS. 22A, 22B and 22C are wave form diagrams of outputs from a light detector when each position of the bar-cord shown in FIG. 21 is read out;

FIG. 23 is a block diagram of one embodiment of a reading position correcting device according to the invention;

FIG. 24 is a diagram of another embodiment of a reading position correcting mark shown in FIG. 21;

FIG. 25 is a diagram of a further embodiment of the reading position correcting mark shown in FIG. 21; and FIGS. 26A, 26B and 26C are wave form diagrams of outputs from a light detector when each position of the mark shown in FIG. 25 is read out.

DETAILED DESCRIPTION OF THE PREFERRED EMBODIMENTS

Figure 1:
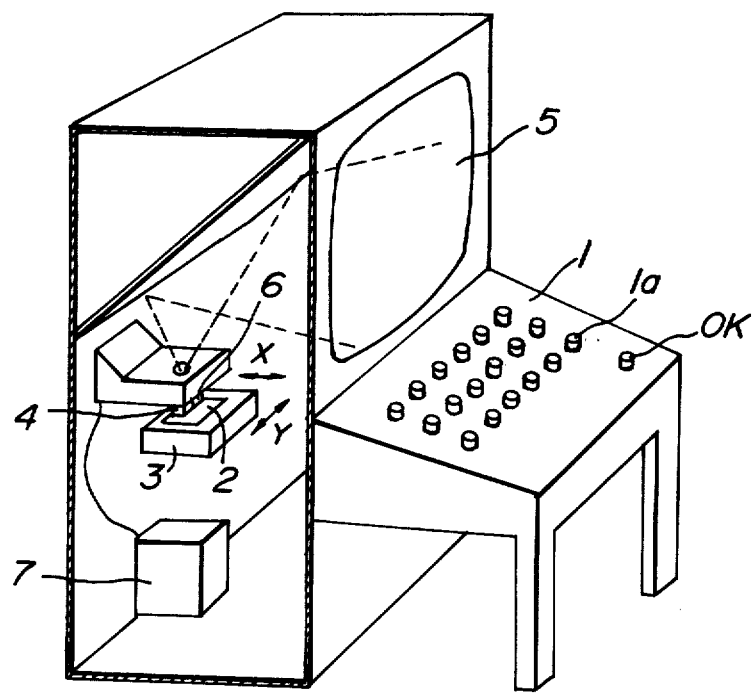
FIG. 1 is a perspective view of one embodiment of an automatic microfilm retrieval system according to the invention.

FIG. 1 shows one embodiment of an automatic microfilm retrieval system according to the invention. In the present invention, if keys 1a of a key board 1 corresponding to the spelling of an index word to be selected are depressed, a stage 3 with a microfilm 2 disposed thereon is moved in X and Y directions so as to bring the index word selected by the depressed keys 1a into alignment with the optical axis of an optical system 4 and the contents of a dictionary or the like recorded on the microfilm 2 is projected on a screen 5.

More particularly, on the microfilm 2 are recorded not only the contents of the dictionary or the like but also retrieval bar-cords to be described later. These retrieval bar-cords are read out by a bar-cord reading mechanism 6 so as to effect the retrieval operation. In addition, the optical system 4 is connected to an automatic focus adjusting mechanism 7 which functions to automatically bring the image projected on the screen 3 in focus. The key board 1 is also provided with an OK key to be described later.

FIG. 2 shows the microfilm 2 shown in FIG. 1. An embodiment in which an English-Japanese dictionary of 1395 pages is recorded on a microfilm (microfiche) of 100×125 mm² (effective size of 90×115 mm²) in a reduced scale will now be described. In this case, a rate of reduction is 1/43 and each half page 10-1-1, 10-1-2, ) . . . of the dictionary is recorded on the microfilm 2. Each half page is divided into substantially four square regions. But, each half page is not always divided into four regions depending on the arrangement of letters. One of these four square regions is projected on one visual field of the screen 5.

In the present embodiment, at the side of each square region is arranged a first bar-cord 11-1, 11-2 . . . representing the spelling of a first index word included in each square region. Such first bar-cord may represent a main index word included in each square region instead of the first index word included in each half page. This first bar-cord is composed of 100 bits, 1 bit being represented by black and white, for example. Since English alphabet consists of 26 letters, 1 letter can be expressed by 5 bits, and as a result, the first bar-cord can represent one word consisting of at most 20 letters which are sufficiently long letters for the English-Japanese dictionary.

Then, on the microfilm 2 are recorded second barcords 12-1-1, 12-1-2, . . . , each composed of 200 bits with respect to each half page 10-1-1, 10-1-2, . . . , composed of a group of four square regions. First 100 bits A of the second bar-cord represent the first index word of each half page and succeeding 100 bits B represent the last index word of each half page. Near each of these second bar-cords is arranged a stop signal S which is used for determining a retrieval position. In addition, provision is made of a third bar-code for each line of the half page, that is, provision is made of a third bar-cord 13-1, 13-2, . . . composed of 200 bits for one line of the half page 10-1-1, 10-1-2, . . . , 10-1-n, a third bar-cord 13-2 composed of 200 bits for the next line of the half page 10-2-1, 10-2-2, . . . , 10-2-n.

Similar to the above described second bar-cords for each half page, in the case of line 1, for example, the first 100 bits A of the third bar-cord 13-1 represent the first index word of the first half page 10-1-1 and the succeeding 100 bits B represent the last index word of the last half page 10-1-n. Near each of these third bar-cords is arranged the stop signal S. The measures similar to the above are also taken for the succeeding lines. Each of the above described bar-cords is arranged along the retrieval direction.

In the present invention, the microfilm 2 bearing the contents of the dictionary and bar-cords is used for the purpose of automatically retrieving the contents of the dictionary in the following manner. In the first place, let it be assumed that the bar-cord reading mechanism 6 is located at a position on the film 2 designated by reference numeral 14 in FIG. 2. If the English word "GREEK" is to be retrieved, for example, at first, that key 1a of the keyboard 1 which corresponds to a letter "G" is depressed. As a result, the microfilm 2 is moved in a direction shown by an arrow Y to cause the reading mechanism 6 to read out the third bar-cord 13-1. As described above, each bar-cord is arranged along the moving direction of the microfilm 2, so that any other scanning for reading out the bar-cords is not required. As described above, in the third bar-cord 13-1 are written the first and last index words of the first and last half page of the dictionary. If an index word beginning from "G" is included in the line 1 from 10-1-1 to 10-1-n, the movement of the microfilm 2 in the Y direction is stopped at the line 1.

If the index word beginning from "G" is not included in the line 1 from 10-1-1 to 10-1-n, the microfilm 2 is further moved in the Y direction to cause the reading mechanism 6 to read out the third bar-cord 13-2 on the line 2. If the index word beginning from "G" is not included in the line 2, the microfilm 2 is still further moved in the Y direction. In this way, the microfilm 2 is continuously moved. If the index word beginning from "G" is included in the line m from 10-m-1 to 10-m-n, for example, the movement of the microfilm 2 in the Y direction is stopped at the position of the stop sign S on the line m.

Figure 3:
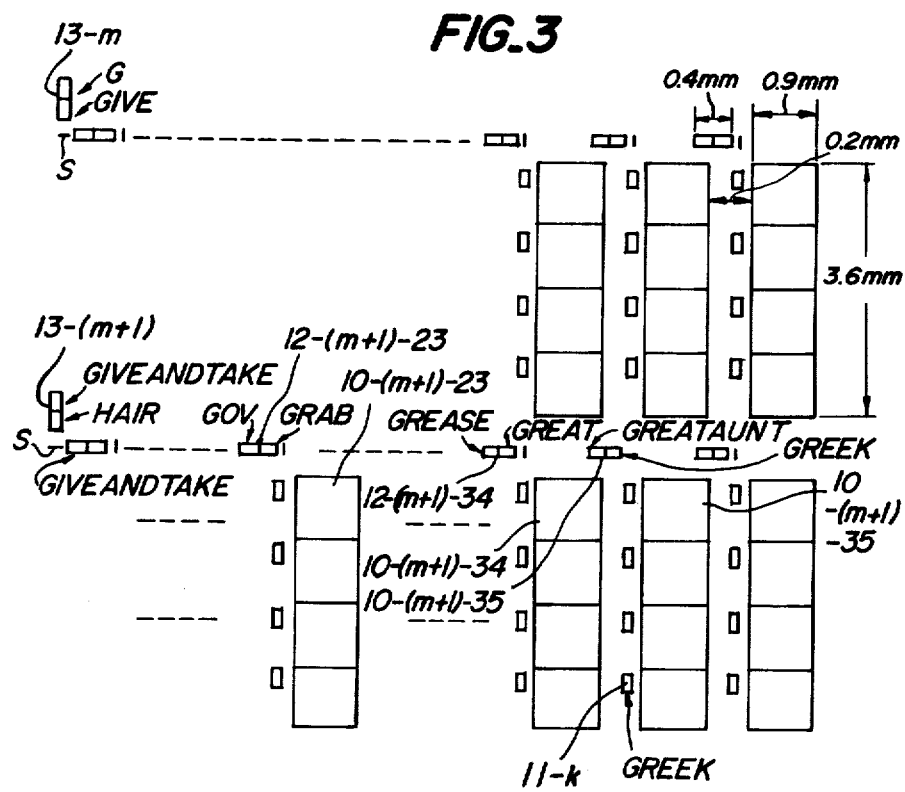
FIG. 3 is an enlarged plan view of a part of the microfilm shown in FIG. 2.

FIG. 3 shows the line m and its vicinity in an enlarged scale. If a key 1a corresponding to "R" is depressed, the input letters obtained by depressing the key become "GR".

If the index word beginning from "GR" is not included in the line m, the microfilm 2 is further moved in the Y direction to cause the reading mechanism 6 to read out the third bar cord 13-(m+1) ) on the line (m+1). If the index word beginning from "GR" is included in the line (m+1), the movement of the microfilm 2 in the Y direction is stopped at the position of the stop sign S.

As shown in FIG. 3, the line (m+1) includes therein index words from "GIVE AND TAKE" to "HAIR", so that the index word beginning from "GR" is not included in the line (m+1) at all. As a result, the microfilm 2 is moved in the X direction and stopped at the half page 10-(m+1)-23 including therein the word beginning from "GR".

Then, the key corresponding to "E" is depressed to obtain an input "GRE". If the input becomes "GRE", the microfilm 2 is further moved in the X direction to cause the reading mechanism 6 to read out second barcords 12-(m+1)-24, 12-(m+1)-25, . . . corresponding to each half page. If the index word beginning from "GRE" is included in the half page 10-(m+1)-34, the movement of the microfilm 2 in the X direction is stopped at the position of the stop signs S of the second bar-cord 12-(m+1)-34 associated with the half page 10-(m+1)-34. If a key corresponding to "E" is depressed, an input "GREE" is obtained. If an index word beginning from "GREE" is not included in the half page 10-(m+1)-34, the microfilm 2 is further moved in the X direction to cause the reading mechanism 6 to read out a second bar-cord 12-(m+1)-34 associated with the half page 10-(m+1)-34. If the index word beginning from "GREE" is included in the next half page 10-(m+1)-35, the movement of the microfilm 2 in the X direction is stopped at the position of the stop sign S of the second bar-cord 12-(m+1)-35 associated with the next half page 10-(m+1)-35.

If a key corresponding to "K" is depressed, an input "GREEK" is obtained. In this case, it is uncertain whether or not an index word beginning from "GREEK" is included in this half page or becomes deviated from this half page when the next key is depressed, so that the microfilm 2 is not moved.

If a key "OK" showing the absence of the key input is depressed, it is found out that "Greek" is included in this half page 10-(m+1)-35. Then, the microfilm 3 is moved again in the Y direction to retrieve this half page and is stopped at a first bar-cord 11-K showing "GREEK".

If the bar-cord which coincides with the key input is absent, the microfilm 2 is stopped at a position where the input cord exceeds the bar-cord. After the above described automatic retrieving operation has been completed, the retrieved portion is projected on the screen 5.

Figure 4A:
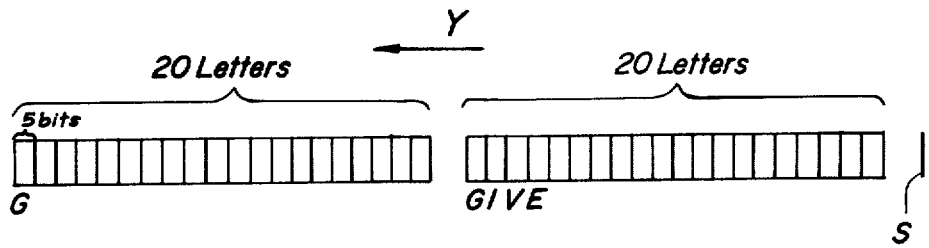
FIGS. 4A and 4B are enlarged plan views of barcords for use in the microfilm shown in FIGS. 2 and 3.
Figure 4B:

The above described movement of the microfilm 2 is controlled in the following manner. As shown in FIG. 4, each bar-cord represents each letter such that the first 5 bits represent the capital letter and that the next succeeding 5 bits represent the 2nd letter. To each letter is assigned a binary number in the order of ABC and these numbers constitute cords for each letter. The letters supplied as the key input are coded in the same rule. The cords supplied as the key input is subtracted from the first 10 bits of the bar-cord with respect to a number of figures of the letters supplied as the key input, for example, with respect to the input 2×5=10 bits when the two letters "GR" are supplied as the input and the movement of the microfilm 2 is controlled on the basis of a positive value, negative value or zero resulted from the subtraction.

But, at the end of the input, if the "OR" key is depressed, operation on the total figures of the bar-cord may be effected.

As described above, the movement of the microfilm 2 is classified into the following three conditions.

(1) The microfilm 2 is rectilinearly moved in X or Y direction.

(2) The microfilm 2 changes its direction of movement from X direction to Y direction or vice versa.

(3) The microfilm 2 becomes stopped to await the next key input.

The movement of the microfilm 2 under the above conditions can be controlled in the following manner.

If the bar-cord such as the second bar-cord for each half page and the third bar-cord for each line is composed of two bar-cords A, B, at first the bar-cord A is subtracted from the input cord and then the bar-cord B is subtracted from the input cord. If the remainder of the former subtraction is positive and the remainder of the latter subtraction is negative, the index word is present on the half page corresponding to the second bar-cord or on the line corresponding to the third bar-cord. As a result, the direction of movement of the manuscript 2 is changed from the direction Y to the direction X and vice versa and then the microfilm 2 is continuously moved. If both the remainders of the former and latter subtractions are positive, the wanted index word is present on the succeeding half page or line. As a result, the rectilineal movement of the microfilm 2 is continued.

If the remainder of the former subtraction is positive and the remainder of the latter subtraction is zero or both the remainders of the former and latter subtractions are zero, it is uncertain whether or not the index word is present on the half page or line concerned. As a result, the microfilm 2 is stopped to await the next key input. Next, if the microfilm 2 is moved in the Y direction in each half page, the first par-cord represents only one index word. As a result, if the remainder of the subtraction of the bar-cord from the input cord is positive, the movement of the microfilm 2 is continued. If the remainder of the subtraction of the bar-cord from the input cord is negative or zero, the microfilm 2 is stopped.

Figure 5:
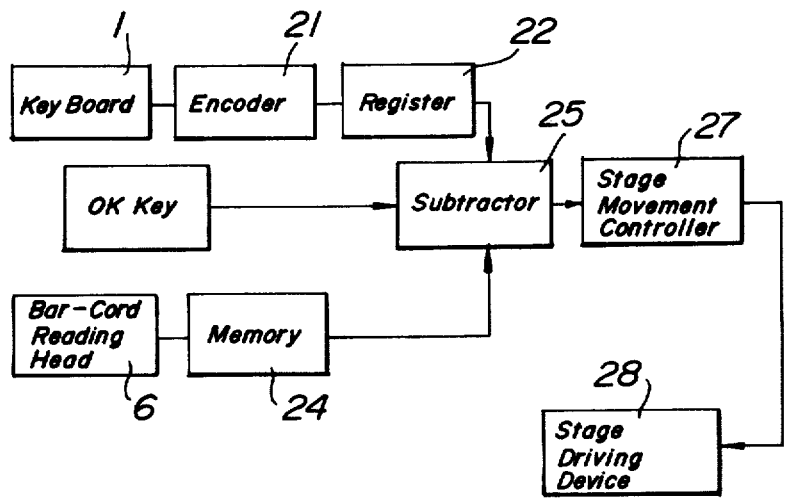
FIG. 5 is a block diagram of the system shown in FIG. 1.

FIG. 5 shows a block diagram of one embodiment of the above described automatic microfilm retrieval system according to the invention. The spelling of an input index word obtained by depressing a key 1a of a key board 20 is supplied to an encoder 21 which functions to convert the index word into a cord which is then stored in a register 22. A bar-cord signal on a microfilm read out by a bar-cord reading mechanism 23 is supplied to a memory 24 which functions to store the bar-cord signal therein. The content of the register 24 and the content of the memory 24 are delivered to a subtractor 25 which functions to subtract the content of the memory 24 from the content of the register 22.

As described above, the number of figures of the operation is controlled by whether or not an OK key 26 is depressed. The remainder of this subtraction is delivered to a stage movement controller 27 which functions to operate a stage driving device 28 so as to move the stage 3 shown in FIG. 1.

In the present embodiment, the retrieval operation is started from a position 14 shown in FIG. 2 and located at the upper left end of the microfilm 2. It is not always necessary to start the retrieval operation from the position 14. It is possible to start the retrieval operation from any desired position on the microfilm 2. In this case, if the remainder of the subtraction effected in the subtracter 25 is negative, this negative value causes the stage movement controller 27 to reverse through the stage driving device 28 the movement of the stage 3. It is preferable to manually retrieve the index word when a number of index words each having the same spelling are arranged side by side on the microfilm 2.

In the present embodiment, the key input has been supplied to the system after the end of the stage movement for the sake of convenience in explanation, but all of the key inputs corresponding to the spelling of one index word may be supplied at the same time without awaiting the end of the stage movement and the OK key 26 may be depressed.

The above mentioned control operations may easily be carried out with the aid of a microcomputer.

The following Table 1 shows a capacity of a microfilm having a size of 100×125 mm² and bearing an English-Japanese dictionary recorded thereon with rates of reduction of 1/43 and 1/70, respectively.

Table 1

| | | |
|---|---|---|
| Microfilm size | 100 × 125 mm² | |
| Microfilm effective size | 90 × 115 mm² | |
| Dictionary size (1 page) | 80 × 155 mm² | |
| Rate of reduction | 1/43 | 1/70 |
| Size of 1 page on microfilm | 1.86 × 3.6 mm² | 1.14 × 2.2 mm² |
| Number of pages included on 1 microfilm | 1,395 | 3,600 |

As seen from the Table 1, one volume of the English-Japanese dictionary is included on one microfilm with the rate of reduction of 1/43.

The following Table 2 shows the minimum line width of a letter used in the dictionary and a letter used in newspapers.

Table 2

| | Dictionary | Newspaper | * |
|---|---|---|---|
| Minimum line width | 60 μm | 120μm | 86 μm |
| Length of letter | 1.3 mm | 1.8 mm | 1.3 mm |

In the above Table 2, numerical values mentioned in the right column * are the minimum line width and length of letter of that letter in the newspaper which is reduced to the letter in the dictionary. As seen from the Table 2, it is clear that the letter in the newspaper is larger in width than the letter in the concise dictionary.

The following Table 3 shows the relation between the resolution and the visual field on respective reading objective lenses having magnifications of 20X and 40X, respectively.

Table 3

| | Reading objective lens | 20X | | 40X | |
|---|---|---|---|---|---|
| | NA | 0.4 | | 0.63 | |
| Reading out | Number of visual fields | 30 mm | | 30 mm | |
| | One side of square visual field | 21.2 mm | | 21.2 mm | |
| | Real visual field | 1.06 mm | | 0.53 mm | |
| | Minimum line width of letter | 60 μm | 86 μm | 60 μm | 86 μm |
| Writing in | Resolvable rate of reduction | 1/30 | 1/43 | 1/49 | 1/70 |
| | One side length of original visual field | 31 mm | 45 mm | 25.9 mm | 37.1 mm |

As seen from the Table 3, if use is made of an objective lens having 20X and number of visual field of 30 mm, then it is possible to record the one side of the original at most 31 mm with 60 μm of the minimum line width of the letter and record the one side of the original at most 45 mm with 86 μm of the minimum line width of the letter. As a result, it is necessary to use a letter whose minimum line width is at least 86 μm in order to record one side of 40 mm of the dictionary on the microfilm. Thus, it is possible to prepare a microfilm by using reduced newspaper letters. If the dictionary letter per se is used, an objective lens having 20X and number of visual field of 37 mm must be designed. The capacity of the microfilm for including the dictionary letters therein becomes ½ times smaller than that of the present embodiment. In addition, the longitudinal letter line is wider in width than the transverse letter line, so that it is possible to increase the capacity of the microfilm for including the letters thereon by recording the longitudinal letter line with a rate of reduction which is two times larger than that of the transverse letter line. This can be effected by a lenticular lens arranged in the transverse direction.

Figure 6:
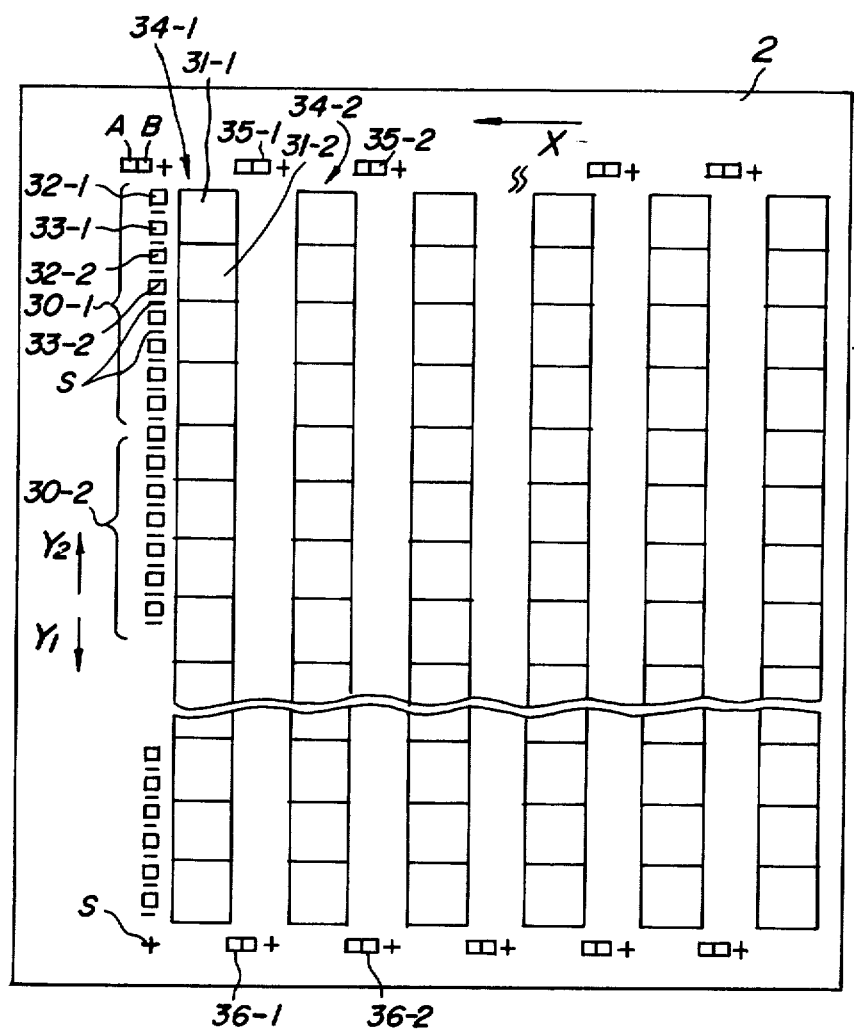
FIG. 6 is an enlarged plan view of one modified embodiment of the microfilm shown in FIGS. 2 and 3.

FIG. 6 shows one modified embodiment of the microfilm shown in FIGS. 2 and 3.

In the present embodiment, each half page 30-1, 30-2, ... is divided into four regions 31-1, 31-2, ... each constituting the minimum unit. These four regions 31-1, 31-2, ... are provided with bar-cords 32-1, 32-2, ... and bar-cords 33-1, 33-2, ..., respectively. One bar-cord is used as a reading bar-cord when the retrieval operation in the $Y_1$ direction is effected, while the other bar-cord is used for reading bar-cord when the retrieval operation in the $Y_2$ direction is effected. In addition, each column 34-1, 34-2, ... of the four regions constitutes a group. Each group is provided with two bar-cords 35-1, 36-1, ... and 35-2, 36-2, ..., respectively, either of these two bar-cords may be read out. In the present embodiment constructed as above described permits to start the retrieval operation from any position on the microfilm 2. In the above described embodiment, use has been made of a microfiche as the microfilm, but a strip-shaped microfilm may also be used. In addition, in the above described embodiment, provision has been made of a bar-cord corresponding to the first index word to each divided region, but provision may also be made of bar-cords corresponding to the first and last index words.

As stated hereinabove, the system according to the invention has a number of advantages. In the first place, it does not require any memory for converting the key input into a position signal and hence is simple in construction and does not require any troublesome operation of preparing the contents stored in the memory. Secondly, the system does not require any special scanning mechanism for reading out the bar-cords and hence is simple in construction. Third, the system can judge the retrieval operation by the key input concerned in the course of the retrieval operation and hence can effect the automatic retrieval operation at a high speed. Finally, the retrieval cords are recorded together with the contents of the dictionary on the microfilm, so that any operation other than the film changing operation is not required when the microfilm is changed into a new one.

Figure 7:
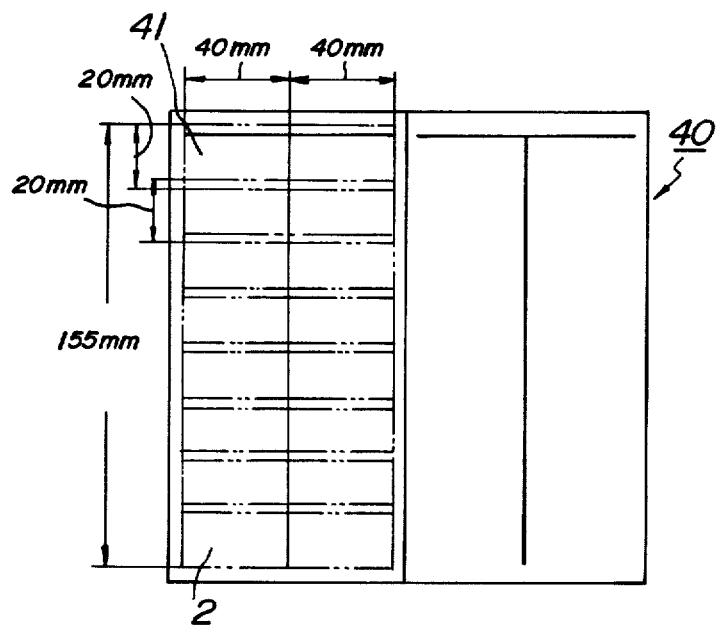
FIG. 7 is a plan view of another modified embodiment of the microfilm shown in FIGS. 2 and 3.

FIG. 7 shows another modified embodiment of the microfilm shown in FIGS. 2 and 3. In the present embodiment, a page 40 of an English-Japanese dictionary bearing letters whose longitudinal line is larger in width than the transverse line is recorded on a microfilm. In the first place, as shown in FIG. 7, the left and right columns of half page of the dictionary 40 are divided into 8 original visual fields 41, each having a transverse length of 40 mm and a longitudinal length of 20 mm.

Figure 8:
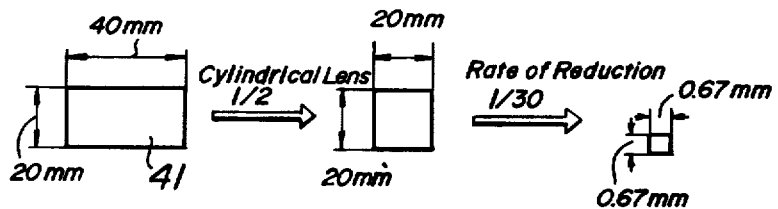
FIG. 8 is a diagram illustrating successive steps of recording one original visual field shown in FIG. 7 on a microfilm in a reduced scale.

Then, as shown in FIG. 8, the above mentioned one original visual field 41 is reduced into ½ scale in the transverse direction only with the aid of a cylindrical lens to obtain a square visual field. This square visual field is then reduced with a rate of reduction of 1/30 and the reduced visual field thus obtained is recorded on a microfilm. In FIG. 8, the visual field reduced to 1/30 scale is shown in an enlarged scale.

Even though the transverse width of the original visual field 41 is reduced into 1/60 scale and the longitudinal width thereof is reduced into 1/30 scale, the longitudinal line width is at least 2 times larger than the transverse line width, so that the reduced original visual field can be reproduced into a sufficiently enlarged scale by means of an objective lens having a magnification of 20X. In addition, in this case, use may be made of an objective lens having a visual field number of 19 mm, that is, use may be made of a microscope lens in general.

Figure 9:
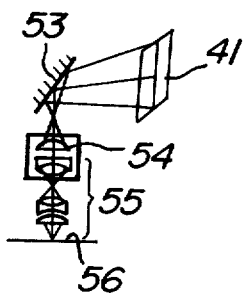
FIG. 9 is a perspective view of an optical system for effecting the recording step shown in FIG. 8.
Figure 10:
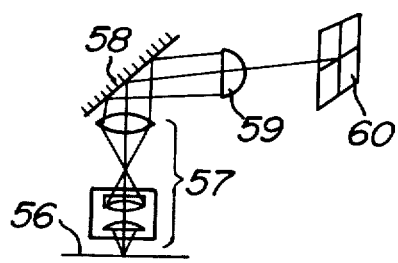
FIG. 10 is a perspective view of an optical system for reproducing an information on a microfilm on a screen.

If a dictionary is recorded on a microfilm in the manner as above described, it is possible to include 1455 pages of the dictionary in one sheet of the above mentioned microfilm having the size of 100×125 mm$^2$ with an extremely high record density. FIG. 9 shows an optical lens for effecting the recording step shown in FIG. 8 and FIG. 10 shows an optical lens for reproducing an information recorded on a microfilm on a screen. A recording optical lens shown in FIG. 9 is composed of a reflecting member 53, a cylindrical lens 54 for effecting a ½ reduction in the transverse direction only and a camera optical system 55 for effecting a 1/30 reduction in both longitudinal and transverse directions. The image of one original visual field 41 is recorded through the reflecting member 53, cylindrical lens 54 and camera optical system 55 on a microfilm 6 with a transverse reduction rate of 1/60 and a longitudinal reduction rate of 1/30.

The reproducing optical lens shown in FIG. 10 is composed of a projection optical system 57 for effecting magnification of 20X in longitudinal and transverse directions, reflecting member 8, cylindrical lens 59 for effecting magnification of 2X in the transverse direction only and screen 60. The information recorded on the microfilm 56 is reproduced and projected through the projection optical system 57, reflecting member 58 and cylindrical lens 59 on a screen 60. That is, the reproduction optical system is composed of a lens system having a ratio between longitudinal and transverse magnifications which is an inverse number with respect to a ratio between longitudinal and transverse reduction rate used when the image of one original visual field 41 is recorded on the microfilm 56.

As stated hereinbefore, the present embodiment permits to record the image of one original visual field 41 on the microfilm 56 with a rate of reduction which is larger in the transverse direction than in the longitudinal direction based on the recognition that in general letters, signs, etc. have a longitudinal line which is wider in width than a transverse line. As a result, the record density per unit area of the microfilm becomes large. In addition, when the record on the microfilm is reproduced on the screen, it is possible to use a magnifying lens having a small visual field number, thereby making the reproduction optical system less expensive.

Left and right columns of half page of the English-Japanese dictionary may be divided into 8 original visual fields, respectively, each having one side of 40 mm in length. In this case, one original visual field is reduced in the transverse direction into ½ scale and then is reduced in both the longitudinal and transverse direction into 1/30 scale. As a result, it is possible to include 1455 pages on one microfilm having a size of 100×125 mm$^2$. In addition, the information thus recorded on the microfilm can be reproduced in an enlarged scale with the aid of an objective lens having a magnification of 20X and visual field number of 30 mm.

FIG. 11 shows another embodiment of an automatic microfilm retrieval system according to the invention. In the present embodiment, if keys 1a of a key board 1 corresponding to the spelling of an index word to be selected are depressed, a stage 3 with a microfilm 2 disposed thereon is moved in X and Y directions so as to bring the index word selected by the depressed keys 1a into alignment with the optical axis of an optical system 4 and the contents of a dictionary or the like recorded on the microfilm is projected on a screen 5. At the same time, the pronunciation of the index word is effected from a speaker 70.

Figure 12:
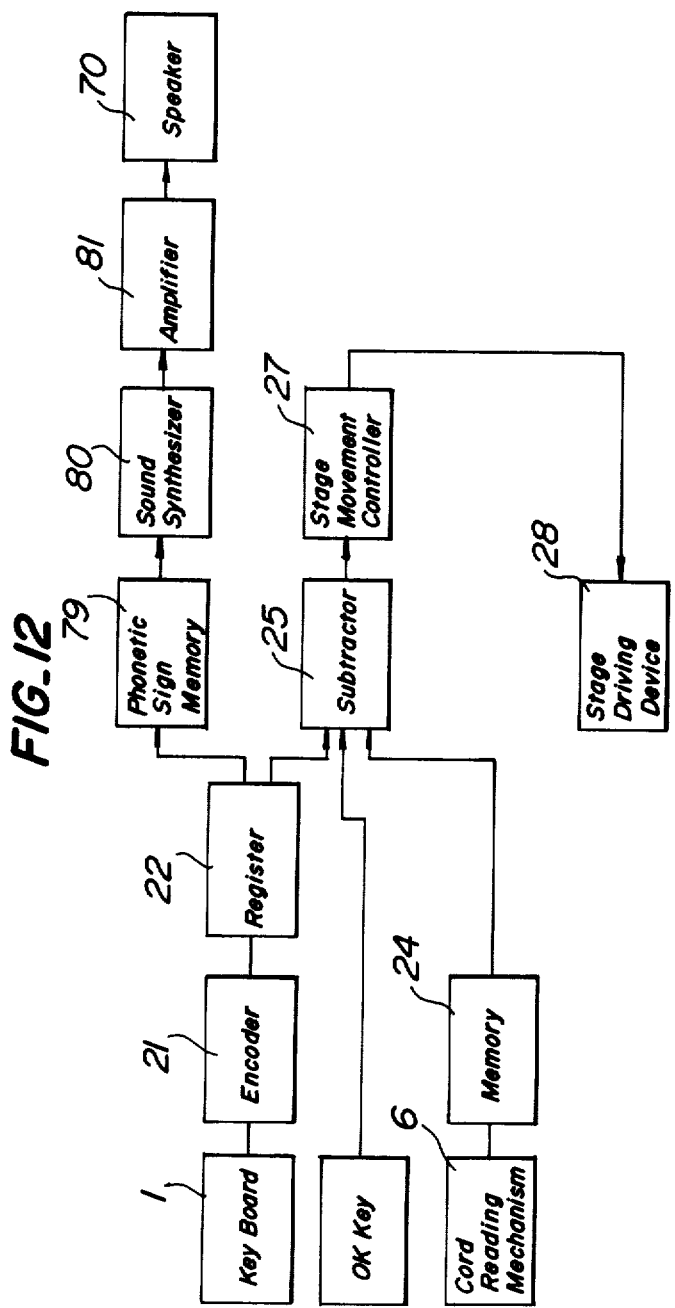
FIG. 12 is a block diagram of the system shown in FIG. 11.

FIG. 12 shows a block diagram of the system shown in FIG. 11. The spelling of an input index word obtained by depressing a key 1a of a key board 1 is supplied to an encoder 21 which functions to convert the index word into a cord which is then stored in a register 22. A bar-cord signal on a microfilm read out by a cord reading mechanism 23 is supplied to a memory 24 which functions to store the bar-cord signal therein. The content of the register 22 and the content of the memory 24 are delivered to a subtractor 25 which functions to subtract the content of the memory 24 from the content of the register 22.

As described above, the number of figures of the operation is controlled by whether or not an OK key 26 is depressed. The remainder of this subtraction is delivered to a stage movement controller 27 to operate a stage driving device 28 so as to move the stage 3 shown in FIG. 11.

In the present embodiment, the cord of the index word delivered from the key board 20 and stored in the register 22 is supplied to a phonetic sign memory 70 which functions to convert the cord of the index word into an array of the phonetic sign cords. That is, the phonetic sign memory 79 functions to store the cord of the phonetic sign of each index word. If a cord corresponding to the English word "phoneme", for example, is stored in the register 22, a cord corresponding to "fóuni:m" is delivered from the phonetic sign memory 79 to a sound synthesizer 80. The sound synthesizer 80 is of a well known one which functions to pronounce a phonetic sign which is delivered thereto. The output from the sound synthesizer 80 is supplied through an amplifier 81 to a speaker 70 which functions to pronounce the contents stored in the register 22, that is, pronounce the index word selected by depressing the keys. In the case of English language, for example, the number of the phonetic signs inclusive of stress sign, etc. is about 60, so that the pronouncing mechanism becomes relatively simple in construction.

In the present embodiment, the index word per se corresponding to the key input obtained by depressing the key has been pronounced. Alternatively, one portion of the content corresponding to the index word may also be pronounced.

As stated hereinbefore, the present embodiment can store the phonetic sign only necessary for phonetically synthesizing in the sound synthesizer 80, so that it is possible to make the store capacity small and as the memory, a magnetic bubble, semiconductor memory, etc. may be used and hence the system becomes small in size. In addition, the system requires few mechanically operable members and hence is long in life.

FIG. 13 shows a further embodiment of an automatic microfilm retrieval system according to the invention. In the present embodiment, provision is made of memory writing in keys 90 and memory reading out keys 91 on the key board 1. If the index word which has once been retrieval is to be stored in a memory, after the key input corresponding to the index word has been obtained by depressing the key, the memory writing in key 90 is depressed so as to store the index word in the memory. If the index word whose contents are stored in the memory is to be retrived, the memory reading out key 91 is depressed, as a result, it is possible to retrieve the index word whose contents are stored in the memory.

In the present embodiment, provision is made of four memories and hence four memory writing in keys 90 and four memory reading out keys 91 are provided on the key board 1. But, it is sufficient to provide at least one memory.

Figure 14:
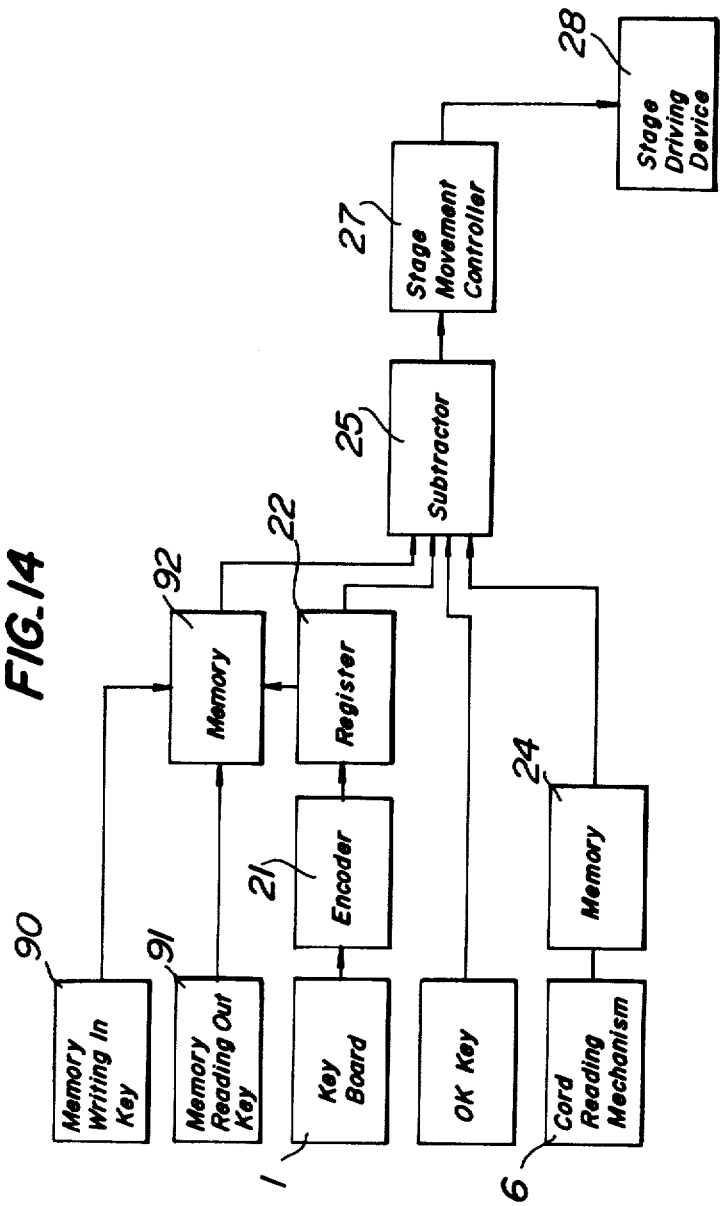
FIG. 14 is a block diagram of the system shown in FIG. 13.

FIG. 14 shows a block diagram of the system shown in FIG. 13. If a memory writing in key 90 is depressed, the content in the register 22 is written into a memory 92. If the index word of the content in the memory 92 is to be retrieved, a memory reading out key 91 is depressed. Then, the content in the memory 92 is supplied to the subtracter 25 which functions to compare the content in the memory 92 with the content in the memory 24, that is, with the barcord which has been read out. The above comparison is basically the same as that previous comparison in which the content in the register 22 is compared with the content in the memory 24. But, it is clear that the operation must be effected under the same condition as the OK key is always depressed, that is, the operation must be effected with respect to all figures of the memory (with respect to 100 bits in the present embodiment).

In the embodiment shown in FIG. 14, only one memory has been shown for the sake of simplifying the drawing, but in the embodiment shown in FIG. 13, provision is made of four memories.

The stored index word may be displayed. In this case, it can easily recognize what kind of word is stored in the memory.

In the present embodiment, the cord representing the index word has been stored in the memory, but the spelling of the word before encoding may be stored. In addition, that position per se of the index word at which it is located may be stored. It is a matter of course that the record on the microfilm is not limited to the English-Japanese dictionary. In addition, the index words corresponding to the key input obtained by depressing the key may be written into the memory 92 in succession so as to be automatically stored therein.

As stated hereinbefore, the present embodiment is capable of storing at least one word to be retrieved and retrieving such word by depressing a given key only one time, whereby the present embodiment is convenient in the case of comparing the meanings of a plurality of words with each other.

Figure 15:
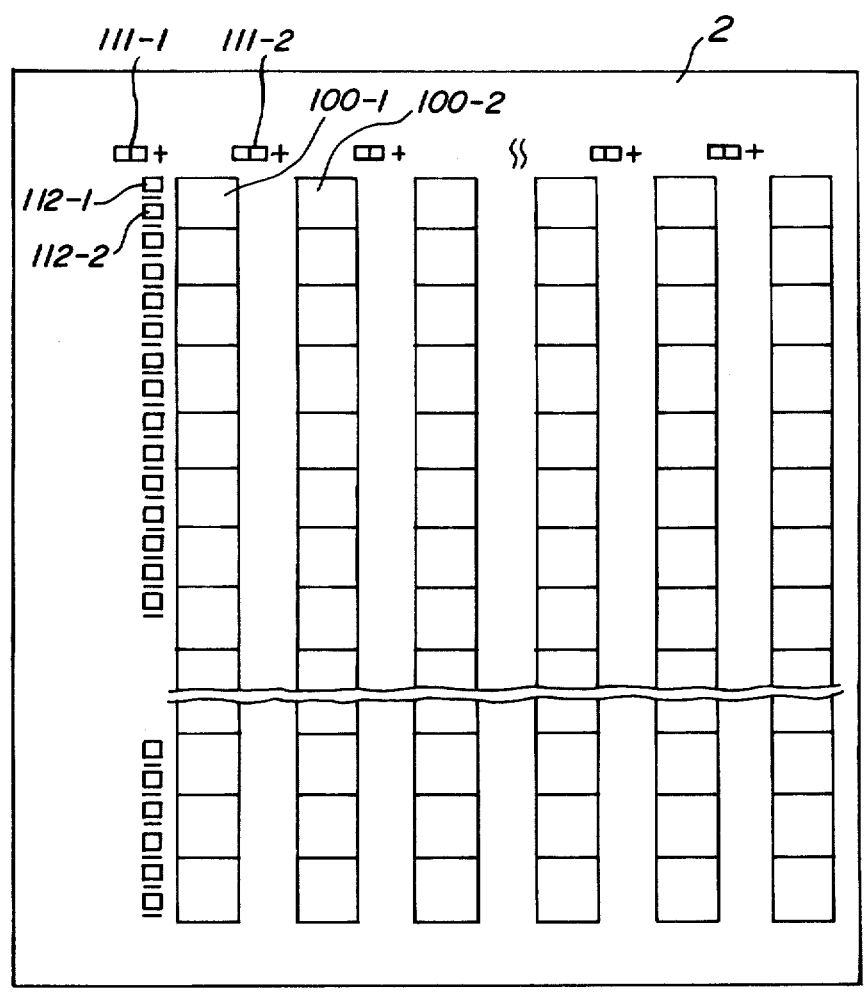
FIG. 15 is an enlarged plan view of a further modified embodiment of the microfilm shown in FIGS. 2 and 3.

FIG. 15 is an enlarged plan view of a further modified embodiment of the microfilm shown in FIGS. 2 and 3.

In the present embodiment, the contents of a dictionary or the like are recorded on portions 100-1, 100-2, . . . , with respect to each column, provision is made of bar-cord 111-1, 111-2, . . . showing the first and last exhibit words of that column. The cord 111-1, for example, shows the first and last exhibit words included in the column 100-1. In addition, signs 112:1, 112-2, . . . are bar-cords corresponding to each exhibit word and a bar-cord showing the phonetic sign of the exhibit word. The bar-cord showing the exhibit word is composed of 100 bits, for example. English alphabet is composed of 26 letters, so that 1 letter can be represented by 5 bits. The bar-cord of 100 bits can express the exhibit word composed of 20 letters. In addition, there are 60 different kinds of the phonetic signs, is that if 6 bits represent 1 phonetic sign and the bar-cord representing the phonetic sign can represent 120 bits, the bar-cord can represent 20 phonetic signs.

Figure 16:
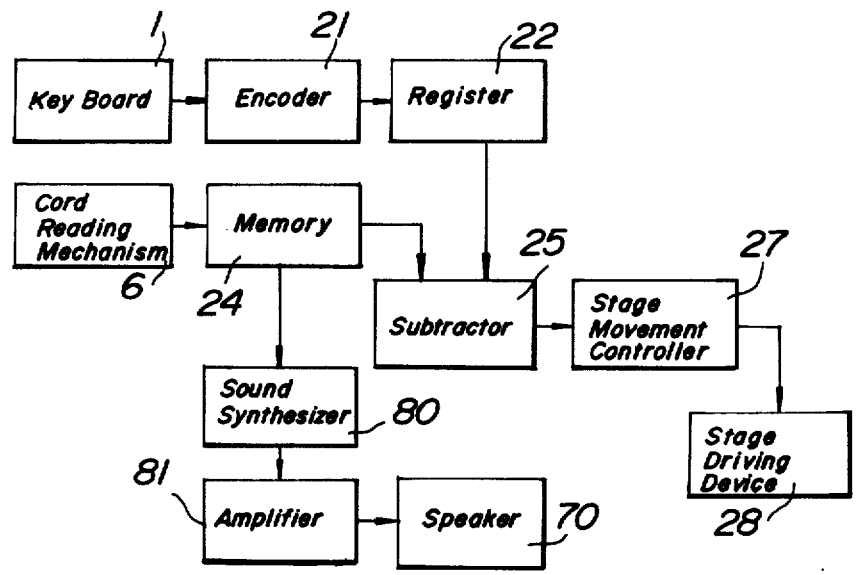
FIG. 16 is a block diagram of a modified embodiment of the system shown in FIG. 11.

FIG. 16 shows a block diagram of a modified embodiment of the system shown in FIG. 11.

If the bar-cord 111:1, for example, is read out, this read out bar-cord 111-1 is compared with the input spelling obtained by depressing the key so as to judge whether or not the input word obtained by depressing the key is present in the column 110-1. If such input word is absent in the column 110-1, the next bar-cord 111-2 is read out. On the contrary, if such input word is present in the column 110-1. those bar-cords 112-1, 112-2, . . . showing the spelling of each word in the column 110-1 are read out in succession until such barcord coincides with the input spelling obtained by depressing the key.

In the present embodiment, if the desired word is retrieved, the phonetic sign of the index word retrieved in the memory 24 is directly supplied to a sound synthesizer 30 which functions to deliver an output sound signal for pronouncing the phonetic sign upon receipt of the input code of the phonetic sign in a well known manner. The output from the sound synthesizer 30 is supplied through an amplifier 31 to a speaker 70 which when driven functions to pronounce the index word.

If the phonetic sign cords recorded on the microfilm are made large in number, it is possible to pronounce a part of the content of the manuscript and the present embodiment, therefore, may be applied to a cookery book.

As stated hereinbefore, the present embodiment is capable of recording the phonetic sign on the microfilm and hence making the memory small in capacity without storing the pronunciation of the index word in a separate memory.

Figure 18:
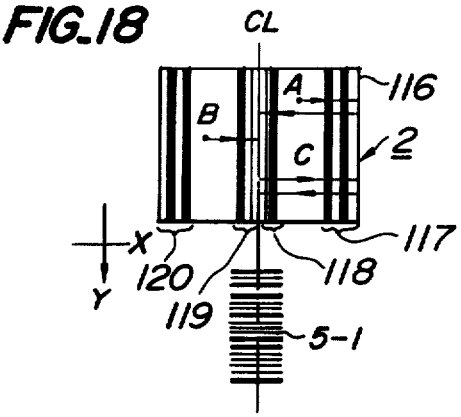
FIG. 18 is an enlarged plan view of an initial position determining mark shown in FIG. 17.
Figure 17:
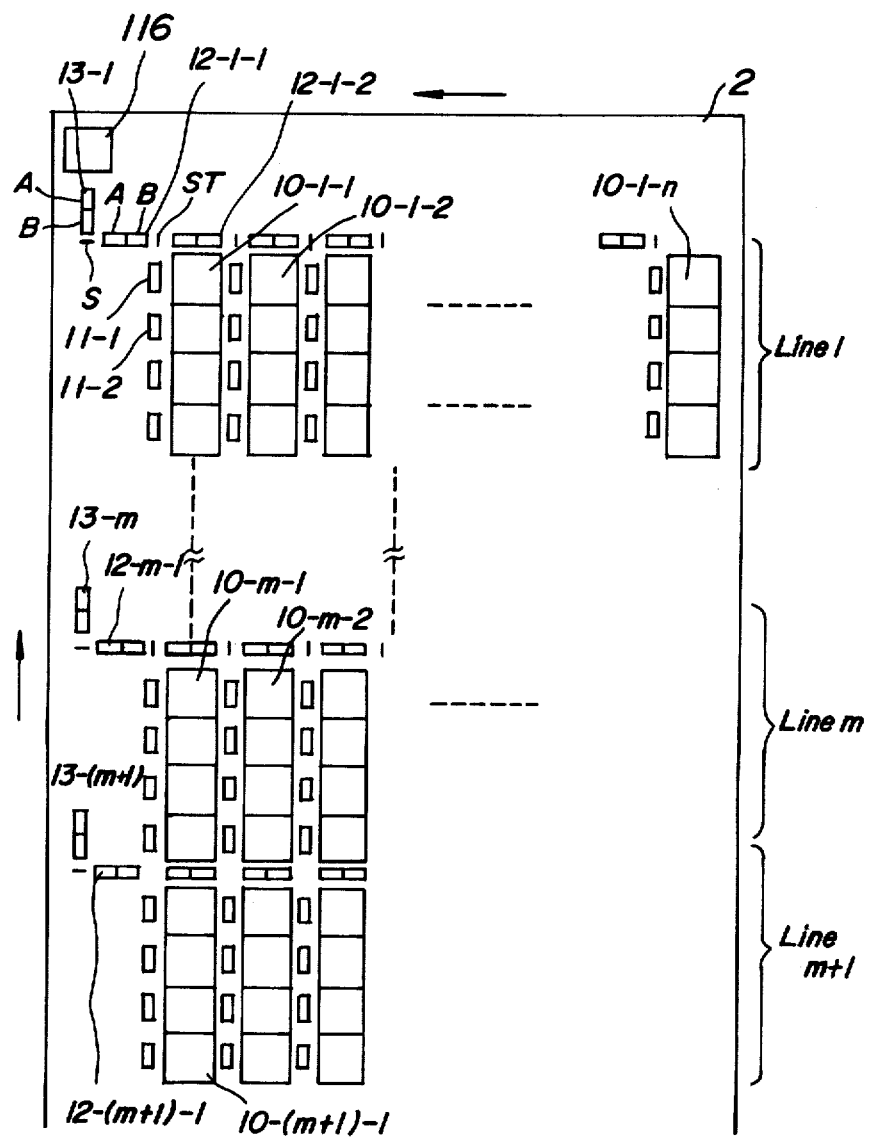
FIG. 17 is an enlarged plan view of a still further modified embodiment of the microfilm shown in FIGS. 2 and 3.

FIG. 17 shows a still further modified embodiment of the microfilm shown in FIGS. 2 and 3. FIG. 18 shows an initial position determining mark shown in FIG. 18. A microfilm 2 is successively retrieved by a third bar-cord 13-1 in Y direction. By taking such retrieval operation of the microfilm 2 into consideration, an initial position determining mark 116 is formed into a region located in front of the third bar-cord 13-1 viewed in the Y direction of the microfilm 2 (a region located at left upper in FIG. 17) and lying on a center line of the third bar-cord 13-n successively arranged in the Y direction, the region being larger than the third bar-cord. The region where the initial position determining mark 116 is formed has a size such that a position determining mechanism which makes use of a conventional mechanical switch, for example, can reliably locate the bar-cord reading head 6 (FIG. 1) at any position within this region 116.

The present embodiment permits the microfilm 2 to move in a manner such that the bar-cord reading head 6 can scan the above mentioned region 116. When the reading head 6 arrives at the center line of the third bar-cord 13-n, the movement of the microfilm 2 is stopped. In this way, it is possible to determine the initial position of the microfilm 2 in an extremely precise manner.

In the present embodiment, the initial position determining mark 116 is formed by directly printing a given pattern on the microfilm 2. If the moving direction (reading direction) caused by an initial direction determining key (not shown) is given, the given pattern may composed of a moving direction reversing portion 117 located at one end of the X moving direction and a pair of movement stop portions 118, 119 located at the center part of the mark 116.

If the initial moving direction is not specified or if the overrun is considered, provision is made of an another moving direction reversing portion 120 located at a position opposite to the reversing portion 117 with respect to the pair of movement stop portions 118, 119 located at the center part of the mark 116.

In the present embodiment, the movement direction reversing portions 117, 120 are formed of thick black-thick black bar lines and the pair of movement stop portions 118, 119 located at the center part are formed of thick black-thin black bar-lines. A signal produced when the center pair of movement stop portions 118, 119 are read out in the order of thin black-thick black is disregarded.

That is, as shown in FIG. 18, if the bar-cord reading head 6 is located at a position A of the initial position determining mark 116 under the condition that the microfilm 2 is disposed on the stage driving device, at first the microfilm 2 is reversed and then stopped at its initial position. If the microfilm 2 is located at a position B, the microfilm 2 is moved in the X direction and stopped at its initial position. If the microfilm 2 is located at the optimum position such as a position C, at first the microfilm 2 is reversed and then stopped at its initial position.

Figure 19:
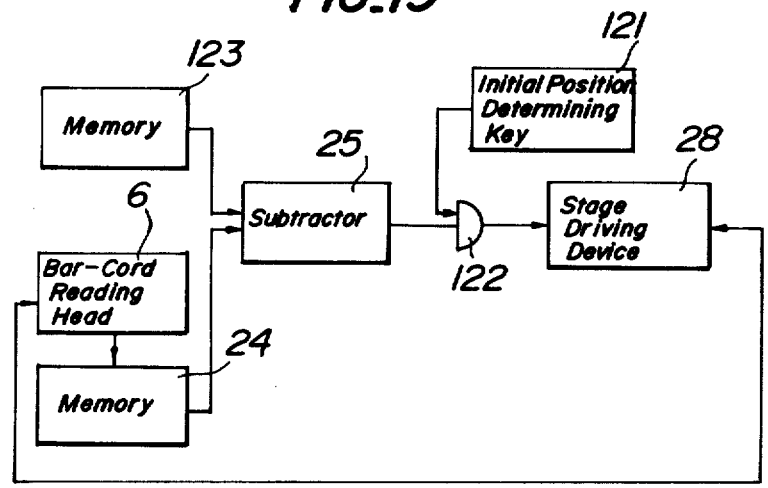
FIG. 19 is a block diagram of a device for determining an initial position of a microfilm according to the invention.

FIG. 19 is a block diagram of a device for determining an initial position of a microfilm according to the invention. A signal from an initial position determining key 121 is supplied through a gate 122 to a stage driving device 28 for driving the stage 3 (FIG. 1). The stage driving device 28 functions to move the stage 3 in a predetermined direction, in the present example, X direction. The initial position determining mark 116 formed on the microfilm 2 is optically read out by a bar-cord reading head 6. The signal read out is stored in a memory 24. This signal read out from the initial position determining mark 116 and stored in the memory 24 is supplied to a subtracter 25 and compared with a pattern information stored beforehand in a memory 123 exclusively used for reading out to generate a signal for discriminating moving direction and stopping operation, thereby stopping the movement of the stage 3 at a given initial position of the microfilm 2.

As stated hereinbefore, in the present embodiment, the relative position between the stage 3 and the bar-cord reading head 6 is not determined for the purpose of determining the initial position of the microfilm 2. On the contrary, in the present embodiment, a relatively large initial position determining mark 116 formed of a given pattern is directly provided on the microfilm 2. In the first place, the microfilm 2 is moved so as to locate the reading head 6 within the mark 116. Then, this mark 116 is optically read out by the reading head 6 so as to determine the relative position between the reading head 6 and the microfilm 2. As a result, the device according to the invention can determine the initial position of the microfilm 2 in an extremely simple and precise manner.

In the present embodiment, the initial position determining mark 116 has been formed of a pattern for determining the position in the X direction. Alternatively, the initial position determining mark 116 may be formed of a pattern for determining the position in the Y direction or a pattern for determining the position in the X and Y directions. The initial position determining mark 116 has been utilized when the microfilm 2 is incorporated into the system. Alternatively, the initial position determining mark 116 may be utilized after the microfilm has been incorporated into the system or before the microfilm 2 is incorporated into the system. In addition, a plurality of initial position determining marks 116 may be provided on a plurality of positions of the microfilm 2 and prior to the use of the microfilm 2 the mark 116 nearest to the cord-bar reading head 6 is utilized to determine the initial position of the microfilm 2.

In the present embodiment, the initial position determining mark 116 and the retrieval bar-cord have been read out by the same bar-cord reading head 6. Alternatively, the mark 116 and bar-cord may be read out by separate reading heads.

In addition, the initial position determining mark 116 may be formed of various constructions, but must be provided with at least a pattern representing a boundary of the regions viewed in the scanning direction.

FIG. 20 shows contents of a dictionary and bar-cords recorded on a microfilm. In the case of reading out bar-cords 131-1, 131-2, 131-3, ... and contents of a dictionary 132-1, 132-2, 132-3, ... by a light spot in a direction shown by an arrow 133, there occurs no problem when the reading out operation is effected along the centers of the bar-cords 131-1, 131-2, 131-3, ... as shown by an arrow 133. But, if the reading direction is slightly deviated from the direction shown by the arrow 133 toward a direction shown by an arrow 134, for example, the displacement of the reading position from its correct positions becomes gradually increased, thereby rendering the reading out operation of the bar-cord 113-3 impossible.

FIG. 21 shows construction of the bar-cord 131-1 shown in FIG. 20. In FIG. 21, reference numeral 140 designates a retrieval bar-cord representing an index word and formed of a conventional one. In the present embodiment, in addition to this retrieval bar-cord 140, provision is made of a reading position correcting mark 141 for detecting and correcting the reading positions, a reference mark 142 having a width which is the same as that of the center part of the reading position correcting mark 141 and correcting the reading position and a starting bar-cord 145 for starting correction of the reading position.

If the bar-cords are read out at their centers as shown by an arrow 144, signals shown in FIG. 22A are obtained. If the bar-cords are read out along their loci deviated from their centers as shown by arrows 145, 146, signals shown in FIGS. 22B, 22C are obtained, respectively.

As seen from FIG. 21 and FIGS. 22A, 22B and 22C, the pulse width of the signals obtained from the reference mark 142 is not changed in response to the reading position thereof. But, the pulse width of the signals obtained from the reading position correcting mark 141 becomes changed in response to the reading position thereof.

FIG. 23 shows a block diagram of a device for correcting the reading position of the microfilm reading device which makes use of the above described change in pulse width of the signals obtained from the reading position correcting mark 141.

A microfilm 2 on which are recorded the above described bar-cords and marks is read out by a light detector 151 to produce the signals shown in FIGS. 22A, 22B, 22C. These signals are supplied through a conventional change-over device 152 to a retrieval signal processing device 153 which functions to compare the input signals with a key board input to produce a retrieval output for retrieving the microfilm bar-cords and marks with the aid of a suitable driving mechanism.

If the reading position correction starting bar-cord 143 is read out by the light detector 151, the change-over device 152 becomes changed over in response to the reading operation of the light detector 151. Then, the change-over device 152 functions to supply the next input, that is, the signal which has read out the reading position correcting reference mark 142 to a memory 154. The memory 154 function to convert the input signal into a digital signal corresponding to the pulse width of the input signal and store the digital signal therein. Subsequently, the change-over device 152 is changed over again to supply the next arriving signal, that is, the signal which has read out the reading position correcting mark 141 to a comparator 155. The comparator 155 functions to convert its input signal into a digital signal corresponding to the pulse width of the input signal and retain the digital signal in a register provided in the comparator 155. In addition, the comparator 155 functions to compare the value of the digital signal with the value which has been stored in the memory 154, that is, subtract the former value from the latter value. The above mentioned value of the digital signal which has been retained in the register provided in the comparator 155 corresponds to the deviation of the reading position, so that the result of the subtraction effected in the subtractor 155 represents the amount of deviation of the reading position. The output from the subtraction 155 is supplied to a light detector driving mechanism 156 which becomes operated in response to the value of the result of subtraction effected in the subtractor 155 to move the light detector 151, thereby bringing the light detector 151 into alignment with the center 144 of the bar-cords.

At the end of the above mentioned operations, the change-over device 152 is again changed over to supply the next reading out signal, that is, the signal corresponding to the retrieval bar-cord 140 to the retrieval signal processing device 153 so as to effect the retrieval operation.

In the present embodiment, provision has been made of the reference mark 152. If the reference mark 152 is absent and the reading speed is different, even when the same position of the reading position correcting mark 141 is read out, the signals to be obtained becomes different from each other. As a result, it is impossible to detect which position has been read out by the light detector 151. In the present embodiment, provision is made of the reference mark 142 and the signal which has read out the reference mark 142 is compared with the signal which has read out the position detecting mark 141. If these two marks are read out at the same speed, even when the reading speed is different, it is possible to detect the reading position. As a result, if the reading speed can correctly be defined the reference mark 142 may be omitted.

In the present embodiment, provision has been made of one of the reading position correcting marks 141, 142 for every one retrieval word bar-cord 140. Alternatively, provision may be made of a plurality of reading position detecting marks 141, 142 or may be interposed between the bar-cords, for example, between the bar-cord 131-1 and the bar-cord 131-2 shown in FIG. 20 or one of the reading position correcting marks 141, 142 may be provided for a plurality of retrieval bar-cords 140.

In the present invention, the position of the light detector 151 has been moved for the purpose of correcting the reading position. Alternatively, the microfilm 2 may be moved. In addition, a light deflector may be inserted into a light receiving path of the light detector 151 and the light deflector may be oscillated so as to correct the reading position.

FIG. 24 shows another embodiment of the reading position correcting mark shown in FIG. 21. The reading position correcting mark shown in FIG. 24 is of step-shaped one instead of frustum-shaped one shown in FIG. 21.

A reading position correcting mark 30 shown in FIG. 25 is of rectangular one inclined to the center line 163. In the present embodiment, the reading position is detected by difference in reading timing T with respect to the reference mark 161.

FIG. 26A shows signals obtained when the bar-cords are read out at their locus deviated from their center as shown by an arrow 162, FIG. 26B shows signals obtained when the bar-cords are read out at thin center as shown by an arrow 163 and FIG. 26C shows signals obtained when the bar-cords are read out at their locus deviated from their center as shown by an arrow 164.

In the embodiments shown in FIGS. 21 and 25, the reading out operation has been effected in one direction only. If the starting cord 143 (FIG. 21) is arranged at both sides of the reading position correcting mark 141, the reading out operation may be effected in two directions.

In addition, in the present embodiment, the cord or mark has been optically recorded on the microfilm. As the above mentioned minute cord reading device, use may be made of a magnetic device or the like for reading out records. In this case, the deviation of the reading position may be detected by changing the strength of magnetization in a direction perpendicular to the reading direction instead of changing the width and the like of the cord. In the present embodiment, the reading position correcting mark 141 has been provided independently of the retrieval bar-cord 140, but the retrieval bar-cord 140 may also be used as the reading position correcting mark 141.

What is claimed is:

1. In an automatic microfilm retrieval system comprising a stage movable in X and Y directions, a microfilm disposed on said stage and bearing contents of a dictionary or the like recorded thereon, an optical system and reading head arranged above and opposed to said microfilm, a screen and a key board provided thereon with a number of keys corresponding to index words to be retrieved, a microfilm portion corresponding to index words selected by depressing said keys being projected on said screen, the improvement comprising a retrieval cord recorded on said microfilm, the surface of said microfilm being divided into a plurality of unit regions to be displayed on said screen at the same time, a cord added to each of said unit regions and representing an index word whose contents are included in each of said unit regions, a plurality of said unit regions being assembled into a plurality of groups, cords added to each of said groups and representing first and last index words included in each of said groups, and a subtracter comparing said cords read out by said reading head with key inputs obtained by depressing said keys and controlling movements of said stage and retrieving said microfilm disposed thereon.

2. The system according to claim 1, wherein said optical system is composed of a recording optical system having a ratio of longitudinal reduction rate to transverse reduction rate which is larger in the transverse reduction rate and a reproduction optical system having a ratio of longitudinal magnification to transverse magnification which is an inverse number of said reduction rate ratio.

3. The system according to claim 1 and comprising further a solid state memory such as a semiconductor memory, magnetic bubble or the like stored therein a phonetic sign representing pronunciation of an index word or contents thereof and a sound synthesizer supplied with said phonetic sign and synthesizing the pronunciation of said phonetic sign and effecting pronunciation thereof.

4. The system according to claim 1 comprising further at least one memory which can write in and read out spelling of a desired index word, a cord representing said spelling or a position at which said index word is located, and a memory writing in and reading out key for retrieving an index word having contents of said memory by depressing said key.

5. The system according to claim 1 and comprising further a bar-cord recorded on said microfilm and representing a phonetic sign corresponding to pronunciation of an index word or contents thereof, a sound synthesizer supplied with said phonetic sign and effecting pronunciation expressing said phonetic sign, and means for reading out a phonetic sign corresponding to a retrieved index word and supplying said phonetic sign to said sound synthesizer.

6. The system according to claim 1 and comprising further a mark formed of a given pattern recorded on said microfilm and located at that region of said microfilm which is larger than a given initial position of said microfilm, an optical reading head located within said mark and optically reading out said mark, and a subtractor comparing said read out mark with a pattern information stored beforehand in correspondence with said given pattern and delivering a signal for moving said reading head relative to said microfilm and stopping said movement so as to determine an initial position of said microfilm.

7. The system according to claim 1 and comprising further a mark recorded on said microfilm and delivering an information representing a deviation of reading position in a direction perpendicular to a direction for reading out said cords and means for correcting said deviation of reading position in response to said information.

* * * * *